United States Patent [19]

Morimoto et al.

[11] Patent Number: 5,344,798
[45] Date of Patent: Sep. 6, 1994

[54] BLUE-COLORED INFRARED AND ULTRAVIOLET RADIATION ABSORBING GLASS AND METHOD OF PRODUCING SAME

[75] Inventors: Shigeki Morimoto; Tadashi Noguchi; Masakazu Taniguchi; Yasushi Taguchi, all of Mie, Japan

[73] Assignee: Central Glass Company, Limited, Ube, Japan

[21] Appl. No.: 928,593

[22] Filed: Aug. 13, 1992

[30] Foreign Application Priority Data

Aug. 14, 1991 [JP] Japan .................. 3-204103

[51] Int. Cl.$^5$ ............................................ C03C 3/087
[52] U.S. Cl. .................................. 501/70; 501/71
[58] Field of Search ............................. 501/70, 71

[56] References Cited

U.S. PATENT DOCUMENTS

| | | | |
|---|---|---|---|
| 2,444,976 | 4/1942 | Brown | 501/70 X |
| 2,860,059 | 9/1953 | Molter et al. | 501/70 X |
| 3,652,303 | 3/1972 | Rao | 501/70 X |
| 4,701,425 | 10/1987 | Baker et al. | 501/70 |
| 4,792,536 | 12/1988 | Pecoraro et al. | 501/70 |
| 5,013,487 | 5/1991 | Cheng | 501/70 X |

FOREIGN PATENT DOCUMENTS 52-38520 3/1977 Japan .
WO9107356 5/1991 PCT Int'l Appl. .

OTHER PUBLICATIONS

J. Kocik et al., "Färben des Glases: Beispiele der Zusammensetzung von Farbgläsern," Feb. 1989 vol. 122 No. 2 pp. 131–137.

J. Kocik et al., "Färben des Glases, V: Beispiele der Zusammensetzung von Farbgläsern," Jan. 1988 vol. 121 No. 1 pp. 42–44.

Primary Examiner—Mark L. Bell
Assistant Examiner—David Sample
Attorney, Agent, or Firm—Keck, Mahin & Cate

[57] ABSTRACT

An infrared and ultraviolet radiation absorbing glass suitable for use in building and vehicle windows, which comprises, on a weight basis, 68.0–73.0% $SiO_2$, 0.1–3.0% $Al_2O_3$, 7.0–11.0% CaO, 2.0–4.2% MgO, 12.0–16.0% $Na_2O$, 0.5–3.0% $K_2O$, 0.02–0.30% $SO_3$, 0.30–0.90% total iron expressed as $Fe_2O_3$, 0.10–0.80% $CeO_2$, 0–1.0% $TiO_2$, 0–0.5% ZnO, 0–0.1% MnO and 0–0.01% CoO. In the glass the ratio of ferrous iron to ferric iron is from 0.8 to 2.5. The glass has a bluish tint and is well balanced in visible light transmittance, infrared radiation absorption and ultraviolet radiation absorption, and a sheet of the glass can easily be tempered by a conventional method. In producing this glass, it is favorable to use cullet of a frit glass in which the ratio of ferrous iron to ferric iron is from 2.0 to 5.0 as a part of a batch of glass compostion to be melted.

21 Claims, No Drawings

BLUE-COLORED INFRARED AND ULTRAVIOLET RADIATION ABSORBING GLASS AND METHOD OF PRODUCING SAME

BACKGROUND OF THE INVENTION

This invention relates to an infrared and ultraviolet radiation absorbing glass and a method of producing the glass. The glass has a bluish color and sufficiently high transmittance for visible light and is particularly suitable for use in building and vehicle windows.

For windows of buildings, automobiles and other vehicles there is an increasing demand for sheet glass that is sufficiently transparent to visible light and absorptive of not only infrared rays but also ultraviolet rays.

It is known to render a soda-lime silica glass absorptive of infrared and ultraviolet rays by incorporating iron in the glass. Ferrous iron expressed as FeO provides for the absorption of infrared radiation, whereas ferric iron expressed as $Fe_2O_3$ provides for the absorption of ultraviolet radiation. In practice $Fe_2O_3$ is used as the source of the entire iron, and an adequate portion of $Fe_2O_3$ is reduced to FeO during the glassmaking process.

Also it is known to incorporate $CeO_2$ and/or $TiO_2$ in a soda-lime silica glass for the absorption of ultraviolet radiation.

From an industrial point of view it is desired that an infrared and ultraviolet absorbing glass in the form of sheet glass can be produced without significantly changing the conditions of conventional glass melting and refining operations. Also it is desired that an infrared and ultraviolet absorbing glass sheet can easily be toughened by a conventional tempering method. Besides, an infrared and ultraviolet absorbing glass sheet is desired to have a pleasing tint such as a greenish tint or a bluish tint.

U.S. Pat. No. 4,792,536 shows an infrared and ultraviolet absorbing glass and a method of producing same. Basically the glass is a soda-lime silica glass. In the glass the content of total iron expressed as $Fe_2O_3$ is up to 1 wt %, and preferably 0.45-0.65 wt %, and at least 35% of the total iron is in the ferrous state as FeO. Besides, the glass contains up to 1.5 wt % of $CeO_2$ and/or $TiO_2$. An important feature of the glass of this patent is that the content of $SO_3$ is less than 0.02 wt %.

From an industrial point of view the proposal of U.S. Pat. No. 4,792,536 is not favorable because the proposed glass cannot be produced by the conventional glass-melting operations. As is disclosed in the patent specification, due to the very low content of sulfur it is necessary to employ a complicated two-stake melting and refining operations by using a special stirring means.

U.S. Pat. No. 4,701,425 shows an infrared and ultraviolet absorbing glass which is basically a soda-lime silica glass and contains 0.29–0.6 wt % of iron expressed as $Fe_2O_3$, 0.1–1.5 wt % of $SnO_2$ and 0.1–1.6 wt % of $TiO_2$. It is permitted that the glass contains up to 0.5 wt % of $SO_3$. However, this glass is insufficient in the capability of absorbing both infrared rays and ultraviolet rays, and it is not easy to desirably toughen this glass by a conventional tempering method.

U.S. Pat. No. 5,013,487 shows an infrared absorbing blue-colored glass containing 0.3–0.7 wt % of iron expressed as $Fe_2O_3$, up to 0.5 wt % of $TiO_2$, up to 0.6 wt % of $SnO_2$ and 0.5–1.2 wt % of ZnO. This glass is low in the absorption of ultraviolet rays.

SUMMARY OF THE INVENTION

It is an object of the present invention to provide an infrared and ultraviolet absorbing glass, which has a bluish tint, is well balanced in visible light transmittance, infrared radiation absorption and ultraviolet radiation absorption and can readily be toughened by a conventional tempering method.

It is another object of the invention to provide a method for industrially easily producing an infrared and ultraviolet absorbing glass according to the invention.

The present invention provides a blue-colored infrared and ultraviolet radiation absorbing glass comprising as essential components, on a weight basis, 68.0–73.0% of $SiO_2$, 0.1–3.0% of $Al_2O_3$, 7.0–11.0% of CaO, 2.0–4.2% of MgO, 12.0–16.0% of $Na_2O$, 0.5–3.0% of $K_2O$, 0.02–0.30% of $SO_3$, 0.30–0.90% of total iron expressed as $Fe_2O_3$, 0.10–0.80% of $CeO_2$, 0–0.5% of $TiO_2$, 0–1.0% of ZnO, 0–0.1% of MnO and 0–0.01% of CoO with provisos that the total of the above defined essential components amounts to at least 98.0 wt % of the glass, that the total of $SiO_2$ and $Al_2O_3$ is from 69.0 to 74.0%, that the total of CaO and MgO is from 11.0 to 15.0%, that the total of $Na_2O$ and $K_2O$ is from 13.0 to 17.0%, that the total of $TiO_2$, ZnO, MnO and CoO is not more than 1.2%, that said total iron includes ferrous iron and ferric iron and that the weight ratio of said ferrous iron to said ferric iron, $Fe^{2+}/Fe^{3+}$, is in the range from 0.80 to 2.50.

A glass according to the invention has a relatively brightly bluish tint and is sufficiently low in both total solar radiation transmittance and ultraviolet transmittance but sufficiently high in visible light transmittance, and this glass is very good in weatherability. This glass is relatively high in Young's modulus, Poisson's ratio and thermal expansion coefficient and relatively low in heat conductivity. An infrared and ultraviolet absorbing glass sheet according to the invention can easily be toughened to a desired degree by a conventional tempering method such as air quenching method. A tempered glass sheet according to the invention is very suitable for use in automobile windows.

In this invention it is an important feature that in the glass the degree of reduction of iron, $Fe^{2+}/Fe^{3+}$ is considerably high. To surely and easily realize a desirably high degree of reduction of iron, it is preferable to produce an infrared and ultraviolet absorbing glass according to the invention by using at least one kind of frit glass which contains ferrous oxide and ferric oxide with a very high degree of reduction as a part of a batch of glass composition to be melted. More particularly, frit glasses useful for this purpose comprise $SiO_2$, $Al_2O_3$, CaO, MgO, $Na_2O$, $K_2O$, $Fe_2O_3$ and FeO, and in the frit glasses the weight ratio of $Fe^{2+}$ to $Fe^{3+}$ is in the range from 2.00 to 5.00.

An infrared and ultraviolet absorbing glass according to the invention can be formed into glass sheets of various thicknesses, for example, ranging from about 1 mm to about ]0 mm, and according to the need the glass sheets can be bent and/or tempered. Of course a glass sheet according to the invention can be used as a component of laminated glass or insulated glass. A glass sheet according to the invention is very suitable for use in building and vehicle windows and particularly in automobile windows. Optionally a glass according to the invention can be used for various articles other than window glasses, such as furniture and cooking utensils for example.

DESCRIPTION OF THE PREFERRED EMBODIMENTS

Basically an infrared and ultraviolet absorbing glass according to the invention is a soda-lime silica glass. The fundamental components of the glass are $SiO_2$, $Al_2O_3$, CaO, MgO, $Na_2O$ and $K_2O$, and the proportions of these components are strictly limited in order that the glass should easily be produced by a usual glass-making process and should possess desirable properties including good temperability.

The glass contains 68.0 to 73.0 wt % of $SiO_2$ together with 0.1 to 3.0 wt % of $Al_2O_3$. If $SiO_2$ is less than 68% or $Al_2O_3$ is less than 0.1% the glass is not always good in weatherability and may exhibit weathering strain. If $SiO_2$ exceeds 73% the glass composition becomes inferior in meltability, and the glass may not be good in temperability. If $Al_2O_3$ exceeds 3.0% the glassmaking operations encounter difficulty because of the liklihood of devitrification and narrowing of the range of temperature for forming glass. Furthermore, in the glass the total amount of $SiO_2$ and $Al_2O_3$ is limited within the range from 69.0 to 74.0 wt %. If the total amount is less than 69% the glass is not always good in weatherability, and if it exceeds 74% the glass may not be good in temperability.

The glass contains 7.0 to 11.0 wt % of CaO and 2.0 to 4.2 wt % of MgO. These components contribute to a reduction in the melting temperature of the glass composition. If CaO is less than 7.0% or MgO is less than 2.0% the melting temperature is not sufficiently low, and the flow point of the glass is not desirably low particularly in the case of shortage of CaO. If CaO exceeds 11.0% the glassmaking operations encounter difficulty because of the liklihood of devitrification. If MgO exceeds 4.2% the glass may not be good in temperability. In the glass the total amount of CaO and MgO is limited within the range from 11.0 to 15.0 wt %. If the total of these two components is less than 11% the glass is not good in temperability, and if it exceeds 15% restrictions are placed on the glassmaking operations because of a tendency to devitrification.

The glass contains 12.0 to 16.0 wt % of $Na_2O$ together with 0.5 to 3.0 wt % of $K_2O$. If $Na_2O$ is less than 12% difficulty arises in the glassmaking operations because of a tendency to devitrification and a narrowed range of temperature for forming the glass, and the glass is not good in temperability. If $Na_2O$ exceeds 16% the glass is not always good in weatherability and may exhibit weathering strain. If $K_2O$ is less than 0.5% the glass may not be good in temperability, and if it exceeds 3% the glass may not be good in weatherability. In the glass the total amount of $Na_2O$ and $K_2O$ is limited within the range from 13.0 to 17.0 wt %. If the total of these two components is less than 13% difficulty will arise in the glassmaking operations because of the liklihood of devitrification and narrowing of the range of operating temperature, and the glass is not good in temperability, and if it exceeds 17% the glass is not good in weatherability.

A glass according to the invention contains a limited amount of sulfur which is known to serve as a melting and refining aid. The glass contains 0.02 to 0.30 wt % of sulfur expressed as $SO_3$. If the content of $SO_3$ is less than 0.02% it is difficult to accomplish uniform melting and defoaming of the glass by usual operations. If the content of $SO_3$ exceeds 0.3% the glass tends to exhibit a yellowish or ambery tint instead of a desired bluish tint. It is preferable that the $SO_3$ content is relatively low and ranges from about 0.05 to about 0.18 wt %.

The essential components of a glass according to the invention include limited amounts of iron oxides (expressed as $Fe_2O_3$ for convenience) and $CeO_2$. These additives are employed for desirably modifying the coloration and optical characteristics of the glass.

In the glass the amount of total iron expressed as $Fe_2O_3$ is from 0.30 to 0.90 wt %. If total iron is less than 0.3% it is difficult to sufficiently reduce the infrared and ultraviolet transmittance through the glass, and if it exceeds 0.9% the glass becomes too low in visible light transmittance and exhibits an undesirably dark tint. In general it is preferable to control the total iron content within the range from 0.45 to 0.75 wt %.

More particularly, the glass must contain both ferrous iron expressed as FeO and ferric iron expressed as $Fe_2O_3$. FeO efficiently absorbs infrared radiation and tends to impart a greenish or bluish tint to the glass. $Fe_2O_3$ is absorptive of ultraviolet rays and tends to impart a yellowish tint to the glass. In a batch of glass composition for producing the infrared and ultraviolet absorbing glass a large portion of iron is in the ferric state, $Fe_2O_3$. The batch is melted under such conditions that an adequate portion of the ferric oxide is reduced to ferrous oxide FeO, while the rest remains ferric oxide $Fe_2O_3$. The degree of reduction of iron is an important factor in the glassmaking operations. Herein, the "degree of reduction" refers to the weight ratio of ferrous iron to ferric iron, $Fe^{2+}/Fe^{3+}$, in the obtained glass. In the present invention the degree of reduction of iron is controlled within the range from 0.80 to 2.50. A preferred range of the degree of reduction is from 1.10 to 1.70.

$CeO_2$ is incorporated in the glass as an ultraviolet absorbing agent. $CeO_2$ has high ability to absorb ultraviolet rays, but the presence of a large amount of $CeO_2$ is obstructive to the reduction of ferric oxide to ferrous oxide. In this invention the content of CeO in the glass is limited within the range from 0.10 to 0.80 wt %. In general it is preferable that the content of $CeO_2$ is nealy equivalent to the content of $Fe_2O_3$.

Optionally the glass may contain up to 1.0 wt % of $TiO_2$, up to 0.5 wt % of ZnO, up to 0.1 wt % of MnO and/or up to 0.01 wt % of CoO. The total amount of these optional components should not exceed 1.2 wt %. Compared with $CeO_2$, $TiO_2$ is lower in the ability to absorb ultraviolet rays, but the presence of $TiO_2$ does not significantly affect the degree of reduction of iron. It is preferable that the content of $TiO_2$ is not more than 0.5 wt %. ZnO has the function of preventing amber coloration of the glass which may occur due to the presence of sulfur. For example, when sodium sulfate is used in the glass melting operation together with a reducing agent such as carbon there is a possibility of the formation of a sulfide (e.g. reaction of $Fe^{3+}$ with $S^{2-}$) or a polysulfide and a resultant amber coloration called carbon amber. Zinc oxide readily reacts with $S^{2-}$ to form a colorless complex. It is preferable that the content of ZnO is not more than 0.1 wt %. MnO serves for minute adjustment of the coloration of the glass containing iron oxides because MnO has an absorption at about 500 nm and also because the presence of Mn tends to slightly suppress the reduction of iron and slightly promotes the reduction of cerium. The presence of not more than about 350 ppm of MnO is preferable because the addition of a large amount of MnO causes an unfavorable phenomenon such as solarization. CoO serves the purpose of minutely adjusting the bluish color of the glass, but it is preferable that the content of CoO is not more than about 10 ppm.

A preferred embodiment of the invention is a blue-colored infrared and ultraviolet radiation absorbing glass which comprises as essential components, on a weight basis, 68.0–72.0% of $SiO_2$, 1.6–3.0% of $Al_2O_3$, 8.5–11.0% of CaO, 2.0–4.2% 8.5–11.0% of CaO, 2.0–4.2% of MgO, 12.0–16.0% of $Na_2O$, 0.5–3.0% of $K_2O$, 0.02–0.30% of $SO_3$, 0.30–0.90% of total iron expressed as $Fe_2O_3$, 0.10–0.80% of $CeO_2$, 0–1.0% of $TiO_2$, 0–0.5% of ZnO, 0–0.1% of MnO and 0–0.01% of CoO with provisos that the total of the above defined essential components amount to at least 98.0 wt % of the glass, that the total of $SiO_2$ and $Al_2O_3$ is from 69.0 to 74.0%, that the total of CaO and MgO is from 12.0 to 15.0%, that the total of $Na_2O$ and $K_2O$ is from 13.0 to 17.0%, that the total of $TiO_2$, ZnO, MnO and CoO is not more than 1.2%, that the total iron includes ferrous iron and ferric iron and that the weight ratio of ferrous iron to ferric iron, $Fe^{2+}/Fe^{3+}$, is in the range from 0.80 to 2.50. This glass will be referred to as Glass P1.

In producing the Glass P1 it is preferred to use cullet of a frit glass (referred to as frit glass A) of the following composition as a part of a batch of glass composition to be melted. On a weight basis, the frit glass consists essentially of 66.0–72.0% of $SiO_2$, 1.5–3.0% of $Al_2O_3$, 8.0–11.0% of CaO, 2.0–4.2% of MgO, 11.5–16.0% of $Na_2O$, 0.5–3.0% of $K_2O$, 0–0.3% of $SO_3$, 2.0–5.0% of total iron expressed as $Fe_2O_3$ and 0–5% total of $CeO_2$, $TiO_2$, MnO and ZnO with provisos that the total of $SiO_2$ and $Al_2O_3$ is from 68.0 to 74.0%, that the total of CaO and MgO is from 10.5 to 10.0%, that the total of $Na_2O$ and $K_2O$ is from 12.0 to 17.0%, that the total iron includes ferrous iron and ferric iron and that the weight ratio of the ferrous iron to the ferric iron, $Fe^{2+}/Fe^{3+}$, is in the range from 2.00 to 4.00.

The frit glass A has fundamentally the same composition as the Glass P1, but the frit glass A contains a far larger amount of iron with a relatively high degree of reduction. In the frit glass A the total iron content is increased so that the Glass P1 may be produced by using a relatively small quantity of the frit glass. However, if the total iron content exceeds 5 wt % it becomes difficult to vitrify the frit glass A composition by melting it in an electric furnace of a relatively small size under a highly reducing condition. If the total iron content is less than 2% it is necessary to use a large quantity of the frit glass A in producing the Glass P1, and hence difficulty may arise in dofoaming or homogenizing the melted glass composition. In the frit glass A the above specified range of the degree of reduction of iron is suitable for realization of the aimed proportion of FeO to $Fe_2O_3$ in the Glass P1. It is preferable that in the frit glass A the total iron content is from 2.5 to 4.0 wt % as $Fe_2O_3$ and the degree of reduction of iron is from 2.50 to 3.50. Also it is preferable that the frit glass A contains up to 4.0 wt % of $CeO_2$ such that the content of $CeO_2$ is nearly equivalent to the total iron content. Preferably the frit glass A contains at least one of $TiO_2$, MnO and ZnO together with $CeO_2$, and it is suitable that the total of $TiO_2$, MnO and/or ZnO is not more than 1.0 wt %.

In producing the Glass P1 by using cullet of the above described frit glass A it is suitable that the cullet of the frit glass amounts to 5–45 wt % of a batch of glass composition to be melted. The use of such an amount of the frit glass A is favorable for realization of the aimed degree of reduction of iron in the Glass P1 and the aimed blue color of the Glass P1 and also for stable operation of the glass melting furnace and stable and uniform melting of the glass batch. It is preferable that cullet of the frit glass A amounts to 10–30% of the batch of glass composition. It is optional to use cullet of a plain soda-lime silica glass, which may be either a colorless glass or a bluish color glass, together with cullet of the frit glass A.

Another preferred embodiment of the invention is a blue-colored infrared and ultraviolet radiation absorbing glass which comprises as essential components, on a weight basis, 68.0–73.0% of $SiO_2$, 0.1–2.5% of $Al_2O_3$, 7.0–11.0% of CaO, 2.0–4.2% of MgO, 12.0–16.0% of $Na_2O$, 0.5–3.0% of $K_2O$, 0.03–0.25% of $SO_3$, 0.40–0.80% of total iron expressed as $Fe_2O_3$, 0.10–0.70% of $CeO_2$, 0–1.0% of $TiO_2$, 0–0.5% of ZnO, 0–0.1% of MnO and 0–0.01% of CoO with provisos that the total of the above defined essential components amount to at least 98.0 wt % of the glass, that the total of $SiO_2$ and $Al_2O_3$ is from 69.0 to 74.0%, that the total of CaO and MgO is from 11.0 to 15.0%, that the total of $Na_2O$ and $K_2O$ is from 13.0 to 17.0%, that the total of $TiO2$, ZnO, MnO and CoO is not more than 1.2, that the total iron includes ferrous iron and ferric iron and that the weight ratio of ferrous iron to ferric iron, $Fe^{2+}/Fe^{3+}$, is in the range from 1.00 to 2.00. This glass will be referred to as Glass P2.

In producing the Glass P2 it is preferred to use cullet of the frit glass A in the same manner as in producing the Glass P1. Also it is preferred that a part of a batch of glass composition to be melted is a frit glass (referred to as frit glass B) which is basically a $SiO_2$—$Al_2O_3$—CaO—MgO—$R_2O$ (R represents sodium and potassium) glass containing 0.1–1.0 wt % of total iron with a degree of reduction, $Fe^{2+}/Fe^{3+}$, higher than 3.50 and not higher than 5.00 or cullet of another frit glass (referred to as frit glass C) which is basically a $SiO_2$—$Al_2O_3$—CaO—MgO—$R_2O$ glass containing 20–30 wt % of total iron with a degree of reduction, $Fe_{2+}/Fe^{3+}$, in the range from 2.30 to 3.50. It is preferable to use the frit glass B or a combination of the frit glass B and the frit glass C. In any case the quantity of the frit glass B should not be more than 10 wt % of total silica in the glass composition batch, and the quantity of the frit glass C should not be more than 4 wt % of total silica in the glass composition batch. Preferably the quantity of the frit glass B is 2–6 wt % of the total silica, and the quantity of the frit glass C is not more than 3 wt % of the total silica. Both the frit glass B and the frit glass C may optionally contain up to 0.5 wt % of $SO_3$ and/or up to about 0.5 wt % of MnO. The use of the frit glass B and/or the frit glass C is very effective for realization of the aimed degree of reduction of iron in the Glass P2 and the desired blue color of the Glass P2 and also for stabilization of the operation of the glass melting furnace and homogenization of the melted glass composition. It is optional to use cullet of a plain soda-lime silica glass, which may be either a colorless glass or a bluish color glass, together with cullet of the frit glass B and-/or the frit glass C.

In melting a batch of glass composition containing cullet of the frit glass B and/or the frit glass C, it is preferable to perform the melting in the presence of sodium sulfate and/or carbon powder. The quantity of sodium sulfate should not be more than 0.5 wt %, and preferably not more than 0.4 wt %, of total silica in the glass composition batch, and the quantity of carbon powder should not be more than 1.0 wt %, and preferably not more than 0.5 wt %, of total silica in the glass composition batch. By using sodium sulfate and/or carbon together with the frit glass B and/or the frit glass C it becomes easy to melt the glass composition and obtain a defoamed and homogenized molten glass by using a conventional tank furnace under usual operating conditions, and the aimed infrared and ultraviolet absorbing glass can be obtained with very good quality and evenness of the desired blue color.

As to the optical characteriscs of an infrared and ultraviolet absorbing glass according to the invention, it is preferable and possible to meet the following conditions. The glass at a thickness of 5 mm is not lower than 60% in visible light transmittance measured by using CIE standard illuminant A, not higher than 50% in total solar radiation transmittance, 5-11% in the transmittance for infrared ray at wavelength of 1100 nm, not higher than 25% in ultraviolet radiation (290-390 nm) transmittance, from 495-505 in dominat wavelength and from 5 to 9 in excitation purity. When these conditions are satisfied the glass is very useful for a reduction in air conditioning loads or an improvement in habitability of rooms or vehicle cabins while affording good visibility through the glass, and the glass assumes a bright blue color, as desired, without glaring.

The following nonlimitative examples are illustrative of the invention.

EXAMPLE 1

A frit glass (frit glass A) was produced by using industrial raw materials of glass. That is, silica sand, feldspar, soda ash, dolomite, limestone, red iron oxide (rouge), ilmenite, titanium oxide, cerium carbonate, zinc oxide and sodium sulfate were weighed and mixed aiming at a prescribed glass composition. As a reducing agent carbon powder was added to the mixed materials so as to amount to about 0.8 wt % of the glass. The mixture was melted in an electric furnace, and the molten glass was homogenized and clarified by conventional operations.

The obtained frit glass A contained, on a weight basis, 68.3% $SiO_2$, 1.6% $Al_2O_3$, 8.9% CaO, 3.0% MgO, 12.5% $Na_2O$, 0.7% $K_2O$, 2.45% total iron expressed as $Fe_2O_3$, 2.4% $CeO_2$, 0.05% $TiO_2$, 0.01% ZnO, 0.05% $SO_3$ and 100 ppm of MnO. The total of these components amounted to 99.97%. The total of $SiO_2$ and $Al_2O_3$ was 69.9%; the total of CaO and MgO was 11.9%; and the total of $Na_2O$ and $K_2O$ was 13.2%. The degree of reduction of iron, $Fe^{2+}/Fe^{3+}$, was about 3.05.

Next, an infrared and ultraviolet absorbing glass sheet was produced by using cullet of the frit glass A together with the raw materials mentioned above. The amount of the frit glass A was adjusted so as to provide about 20 wt % of the aimed glass composition. The glass composition was formulated such that the viscosity-temperature becomes about 650°-685° C. at $10^9$ poise and about 555°-685° C. at $10^{12}$ poise and such that the difference between the two temperatures becomes about 96°-103° C. In a crucible the mixture of raw materials and frit glass was melted by heating in an electric furnace at about 1400° C. for about 3 hr. In the melting operation carbon powder amounting to about 0.7 wt % of total silica was used together with sodium sulfate amounting to about 0.3 wt % of total silica. After the usual homogenizing and clarifying operations the molten glass was formed into a glass sheet. After annealing the glass sheet was cut into about 50 mm square pieces, and each piece was ground to a thickness of 3.8 mm.

By chemical analysis the obtained glass contained, on a weight basis, 70.0% $SiO_2$, 1.8% $Al_2O_3$, 9.1% CaO, 3.6% MgO, 13.4% $Na_2O$, 0.7% $K_2O$, 0.55% total iron expressed as $Fe_2O_3$, 0.55% $CeO_2$, 0.10% $TiO_2$, 0.03% ZnO, 0.14% $SO_3$ and 200 ppm of MnO. The total of these components amouted to 99.99%. The total of $SiO_2$ and $Al_2O_3$ was 71.8%; the total of CaO and MgO was 12.7%; and the total of $Na_2O$ and $K_2O$ was 14.1%. The degree of reduction of iron, $Fe^{2+}/Fe^{3+}$, was about 2.05.

The obtained glass had a blue color. The optical characteristics of this glass were measured by the methods according to JIS Z 8722, JIS R 3106 and ISO/DIS 9050 by using an automated spectrophotometer. At a thickness of 5 mm the glass exhibited visible light (standard illuminant A) transmittance of about 71%, total solar radiation transmittance of about 40% and ultraviolet transmittance of about 23%. The transmittance for solar radiation in an infrared region (around 1100 nm) was about 9%. The dominant wavelength was about 491 nm, and the excitation purity was about 7.7.

It was confirmed that the viscosity-temperatures of this glass were as aimed. To test temperability, some of the glass sheets (3.8 mm in thickness) were tempered by heating in a furnace at about 700° C. for about 5 min and immediately blowing cooling air against the heated glass sheet. The tempered glass sheets were fractured by an impact at a point in a corner region to examine the manner of fragmentation in respect of the number of fragments and the sizes of the respective fragments. The manner of fragmentation satisfied the requirements of JIS R 3211 for tempered glasses for automobile side and rear windows.

EXAMPLE 2

The glass making process of Example 1 was repeated with the aim of a slightly different glass composition. In this case cullet of the frit glass A and cullet of a plain, colorless soda-lime silica glass were mixed with the raw materials of glass such that the frit glass A provided about 20 wt % of the aimed glass composition and such that the plain soda-lime silica glass provided about 30% of the glass composition.

The obtained glass contained, on a weight basis, 70.2% $SiO_2$, 1.8% $Al_2O_3$, 9.1% CaO, 3.5% MgO, 13.5% $Na_2O$, 0.6% $K_2O$, 0.53% total iron expressed as $Fe_2O_3$, 0.53% $CeO_2$, 0.09% $TiO_2$, 0.01% ZnO, 0.10% $SO_3$ and 100 ppm of MnO. The total of these components amounted to 99.97%. The total of $SiO_2$ and $Al_2O_3$ was 72.0%; the total of CaO and MgO was 12.6%; and the total of $Na_2O$ and $K_2O$ was 14.1%. The degree of reduction of iron, $Fe^{2+}/Fe^{3+}$, was about 1.15.

The obtained glass had a blue color. At a thickness of 5 mm this glass exhibited visible light (standard illuminant A) transmittance of about 72.5%, total solar radiation transmittance of about 42.5% and ultraviolet transmittance of about 20.5%. The transmittance for solar radiation in the infrared region was about 10.5%. The dominant wavelength was about 491 nm, and the excitation purity was about 7.2.

The temperability of this glass was tested by the same method as in Example 1. The tempering was accomplished without problem, and the result of the fracture test satisfied the provisions of the standard.

EXAMPLE 3

In this example, cullet of frit glass B described hereinbefore was used together with cullet of a plain soda-lime silica glass and a mixture of the raw materials of glass mentioned in Example 1. The frit glass B amounted to about 6 wt % of total silica in the batch of glass composition. The mixed cullet of the frit glass B and the plain soda-lime silica glass contained 48.9 wt % of $SiO_2$, 8.9 wt % of $Al_2O_3$, 29.3 wt % of CaO, 5.2 wt % of MgO, 6.1 wt % of $R_2O$, 0.11 wt % of $SO_3$, 0.5 wt % of $S^{-2}$, 0.19 wt % of total iron expressed as $Fe_2O_3$, 0.48 wt % of $TiO_2$ and 0.25 wt % of MnO, and the degree of reduction of iron, $Fe^{2+}/Fe^{3+}$, was about 4.0. In this case the raw materials did not include ZnO.

Using these materials an infrared and ultraviolet absorbing glass was produced by almost the same method as in Example 1. In the glass melting operation carbon powder amounting to about 0.2 wt % of total silica was used together with sodium sulphate amounting to about 0.3 wt % of total silica.

The obtained glass contained, on a weight basis, 70.4% $SiO_2$, 1.9% $Al_2O_3$, 9.0% CaO, 3.5% MgO, 13.3% $Na_2O$, 0.9% $K_2O$, 0.44% total iron expressed as $Fe_2O_3$, 0.42% $CeO_2$, 0.07% $SO_3$ and 250 ppm of MnO. The total of these components amounted to 99.93%. The total of $SiO_2$ and $Al_2O_3$ was 72.3%; the total of CaO and MgO was 12.5%; and the total of $Na_2O$ and $K_2O$ was 14.2%. The degree of reduction of iron, $Fe^{2+}/Fe^{3+}$, was about 1.11.

The obtained glass had a blue color. At a thickness of 5 mm this glass exhibited visible light transmittance of about 72.8%, total solar radiation transmittance of about 42.4% and ultraviolet transmittance of about 20.%. The transmittance for solar radiation in the infrared region was about 10%. The dominant wavelength was about 501 nm, and the excitation purity was about 6.

The temperability of this glass was tested by the same method as in Example 1. The tempering was accomplished without problem, and the result of the fracture test satisfied the provisions of the standard.

When a mixed cullet of the frit glass B and a plain soda-lime glass is used as illustrated by Example 3, it is preferable that the mixed cullet contains 30–50 wt % of $SiO_2$, 8–14 wt % of $Al_2O_3$, 28–45 wt % of CaO, 5–8 wt % of MgO, 0.7–7 wt % of $R_2O$, 0.05–0.15 wt % of $SO_3$, 0.3–0.7 wt % of $S^{2-}$, 0.18–0.30 wt % of total iron expressed as $Fe_2O_3$, 0.4–0.9 wt % of $TiO_2$ and 0.2–0.5 wt % of MnO.

EXAMPLE 4

The glass making process of Example 3 was repeated except that ZnO was included in the raw materials and that the amount of sodium sulfate was changed to 0.2 wt % of total silica.

The obtained glass had neary the same composition as the glass obtained in Example 3, though there were some differences in the following respects. The content of ZnO was 0.01% and the content of $SO_3$ was 0.05%. The total of the identified components was 99.82 wt %. The total of $SiO_2$ and $Al_2O_3$ was 72.0%; total of CaO and MgO was 12.5%; and the total of $Na_2O$ and $K_2O$ was 14.2%. The degree of reduction of iron was about 1.37.

This glass had a blue color. At a thickness of 5 mm this glass exhibited visible light transmittance of about 71.6%, total solar radiation transmittance of about 40.3% and ultraviolet transmittance of about 20.5%. The transmittance for solar radiation in the infrared region was about 8%. The dominant wavelength was about 500 nm, and the excitation purity was about 6.5.

The temperability of this glass was as good as that of the glass of Example 3.

EXAMPLE 5

The glass making process of Example 3 was repeated except that the amount of the frit glass B was changed to 8 wt % of total silica and that the amount of sodium sulfate was changed to 0.2 wt % of total silica.

The obtained glass had nearly the same composition as the glass obtained in Example 3, though there were some differences in the following respects. The content of $SO_3$ was 0.05%, and the content of MnO was about 290 ppm. The total of the identified components was 99.86 wt %. The total of $SiO_2$ and $Al_2O_3$ was 72.0%; total of CaO and MgO was 12.5%; and the total of $Na_2O$ and $K_2O$ was 14.2%. The degree of reduction of iron was about 1.49.

This glass had a blue color. At a thickness of 5 mm this glass exhibited visible light transmittance of about 69.1%, total solar radiation transmittance of about 37.5% and ultraviolet transmittance of about 20%. The transmittance for solar radiation in the infrared region was about 5.5%. The dominant wavelength was about 501 nm, and the excitation purity was about 6.5.

The temperability of this glass was as good as that of the glass of Example 3.

EXAMPLE 6

The glass making process of Example 3 was repeated except cullet of the frit glass C described hereinbefore was used in place of cullet of the frit glass B. The frit glass C was about 2.7 wt % of total silica in the batch of glass composition. The mixed cullet of the the frit glass C and the plain soda-lime glass contained 49.5 wt % of $SiO_2$, 14.5 wt % of $Al_2O_3$, 6.1 wt % of CaO, 1.8 wt % of MgO, 4.4 wt % of $R_2O$, 0.11 wt % of $SO_3$, 6.0 wt % of $Fe_2O_3$, 15.0 wt % of FeO and 0.027 wt % of MnO, and the degree of reduction of iron was about 2.8.

The obtained glass had neary the same composition as the glass obtained in Example 3, though there were some differences in the following respects. The content of $SO_3$ was about 0.04 wt %, and the total of the identified components was 99.86 wt %. The total of $SiO_2$ and $Al_2O_3$ was 72.0%; total of CaO and MgO was 12.5%; and the total of $Na_2O$ and $K_2O$ was 14.2%. The degree of reduction of iron was about 1.40.

This glass had a blue color. At a thickness of 5 mm this glass exhibited visible light transmittance of about 70.5%, total solar radiation transmittance of about 38.8% and ultraviolet transmittance of about 20.5%. The transmittance for solar radiation in the infrared region was about 6.5%. The dominant wavelength was about 501 nm, and the excitation purity was about 6.5.

The temperability of this glass was as good as that of the glass of Example 3.

When a mixed cullet of the frit glass C and a plain soda-lime glass is used as illustrated by Example 6, it is preferable that the mixed cullet contains 45–65 wt % of $SiO_2$, 6–22 wt % of $Al_2O_3$, 4–8 wt % of CaO, 0.8–3 wt % of MgO, 0–11 wt % of $R_2O$, 0.05–0.20 wt % of $SO_3$, 1–7 wt % of $Fe_2O_3$, 4–17 wt % of FeO and 0.02–0.03 wt % of MnO.

EXAMPLE 7

The glass making process of Example 3 was repeated with modifications in the following respects.

The amount of the frit glass B was increased to about 8 wt % of total silica. Furthermore, red iron oxide was partly replaced by the mixed cullet of frit glass C and plain soda-lime silica glass used in Example 6. The frit glass C amounted to about 2.8 wt % of total silica. The amount of sodium sulfate was changed to 0.5 wt % of total silica.

The obtained glass had nearly the same composition as the glass obtained in Example 3, though there were some differences in the following respects. The content of $SO_3$ was 0.04%, and the content of MnO was about 290 ppm. The total of the identified components was 99.86 wt %. The total of $SiO_2$ and $Al_2O_3$ was 72.0%; total of CaO and MgO was 12.5%; and the total of $Na_2O$ and $K_2O$ was 14.2%. The degree of reduction of iron was about 1.36. This glass had a blue color. At a thickness of 5 mm this glass exhibited visible light transmittance of about 71.0%, total solar radiation transmittance of about 39.8% and ultraviolet transmittance of about 20%. The transmittance for solar radiation in the infrared region was about 7.5%. The dominant wavelength was about 501 nm, and the excitation purity was about 6.5.

The temperability of this glass was as good as that of the glass of Example 3.

What is claimed is:

1. A blue-colored infrared and ultraviolet radiation absorbing glass comprising as essential components, on a weight basis, 68.0–73.0% of $SiO_2$, 0.1–3.0% of $Al_2O_3$, 7.0–11.0% of CaO, 2.0–4.2% of MgO, 12.0–16.0% of $Na_2O$, 0.5–3.0% of $K_2O$, 0.05–0.18% of $SO_3$, 0.30–0.90% of total iron expressed as $Fe_2O_3$, 0.10–0.80% of $CeO_2$, 0–1.0% of $TiO_2$, 0–0.5% of ZnO, 0–0.1% of MnO and 0–0.01% of CoO with provisos that the total of said essential components amounts to at least 98.0 wt % of the glass, that the total of $SiO_2$ and $Al_2O_3$ is from 69.0 to 74.0%, that the total of CaO and MgO is from 11.0 to 15.0%, that the total of $Na_2O$ and $K_2O$ is from 13.0 to 17.0%, that the total of $TiO_2$, ZnO, MnO and CoO is not more than 1.2%, that said total iron includes ferrous iron and ferric iron and that the weight ratio of said ferrous iron to said ferric iron, $Fe^{2+}/Fe^{3+}$, is in the range from 0.80 to 2.50.

2. A glass according to claim 1, wherein the amount of said total iron expressed as $Fe_2O_3$ is in the range from 0.40 to 0.80 wt %.

3. A glass according to claim 1, wherein the content of ZnO is not more than 0.1 wt %

4. A glass according to claim 1, wherein the content of MnO is not more than 350 ppm.

5. A glass according to claim 1, wherein the content of CoO is not more than 10 ppm.

6. A glass according to claim 1, wherein the glass at a thickness of 5 mm is not lower than 60% in visible light transmittance, not more than 50% in total solar radiation transmittance, not more than 25% in ultraviolet transmittance, from 5 to 11% in transmittance for infrared radiation at wavelength of 1100 nm, from 495 to 505 nm in dominant wavelength and from 5 to 9 in excitation purity.

7. A blue-colored infrared and ultraviolet radiation absorbing glass comprising as essential components, on a weight basis, 68.0–72.0% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.05–0.18% of $SO_3$, 0.30–0.90% of total iron expressed as $Fe_2O_3$, 0.10–0.80% of $CeO_2$, 0–1.0% of $TiO_2$, 0–0.5% of ZnO, 0–0.1% of MnO and 0–0.01% of CoO with provisos that the total of said essential components amounts to at least 98.0 wt % of the glass, that the total of $SiO_2$ and $Al_2O_3$ is from 69.0 to 74.0%, that the total of CaO and MgO is from 12.0 to 15.0%, that the total of $Na_2O$ and $K_2O$ is from 13.0 to 17.0%, that the total of $TiO_2$, ZnO, MnO and CoO is not more than 1.2%, that said total iron includes ferrous iron and ferric iron and that the weight ratio of said ferrous iron to said ferric iron, $Fe^{2+}/Fe^{3+}$, is in the range from 0.80 to 2.50.

8. A glass according to claim 7, wherein the amount of said total iron expressed as $Fe_2O_3$ is in the range from 0.40 to 0.80 wt %.

9. A glass according to claim 8, wherein the weight ratio of said ferrous iron to said ferric iron is not more than 2.30.

10. A glass according to claim 7, wherein the content of $CeO_2$ is from 0.40 to 0.70 wt %.

11. A glass according to claim 7, wherein the content of ZnO is not more than 0.1 wt %.

12. A glass according to claim 7, wherein the content of MnO is not more than 350 ppm.

13. A glass according to claim 7, wherein the content of CoO is not more than 10 ppm.

14. A blue-colored infrared and ultraviolet radiation absorbing glass comprising as essential components, on a weight basis, 68.0–73.0% of $SiO_2$, 0.1–2.5% of $Al_2O_3$, 7.0–11.0% of CaO, 2.0–4.2% of MgO, 12.0–16.0% of $Na_2O$, 0.5–3.0% of $K_2O$, 0.03–0.25% of $SO_3$, 0.40–0.80% of total iron expressed as $Fe_2O_3$, 0.10–0.70% of $CeO_2$, 0–1.0% of $TiO_2$, 0–0.5% of ZnO, 0–0.1% of MnO and 0–0.01% of CoO with provisos that the total of said essential components amounts to at least 98.0 wt % of the glass, that the total of $SiO_2$ and $Al_2O_3$ is from 69.0 to 74.0%, that the total of CaO and MgO is from 11.0 to 15.0%, that the total of $Na_2O$ and $K_2O$ is from 13.0 to 17.0%, that the total of $TiO_2$, ZnO, MnO and CoO is not more than 1.2%, that said total iron includes ferrous iron and ferric iron and that the weight ratio of said ferrous iron to said ferric iron, $Fe^{2+}/Fe^{3+}$, is in the range from 1.00 to 2.00.

15. A glass according to claim 14, wherein the amount of said total iron expressed as $Fe_2O_3$ is in the range from 0.45 to 0.75 wt %.

16. A glass according to claim 15, wherein the weight ratio of said ferrous iron to said ferric iron is from 1.10 to 1.70.

17. A glass according to claim 14, wherein the content of $CeO_2$ is not less than 0.45 wt %.

18. A glass according to claim 14, wherein the content of ZnO is not more than 0.1 wt %.

19. A glass according to claim 14, wherein the content of MnO is not more than 350 ppm.

20. A glass according to claim 14, wherein the content of CoO is not more than 10 ppm.

21. A glass according to claim 14, wherein the glass at a thickness of 5 mm is not lower than 60% in visible light transmittance, not more than 50% in total sol. at radiation transmittance, not more than 25% in ultraviolet transmittance, from 5 to 11% in transmittance for infrared radiation at wavelength of 1100 nm, from 495 to 505 nm in dominant wavelength and from 5 to 9 in excitation purity.

* * * * *